US012669177B2

(12) United States Patent
Gernand et al.

(10) Patent No.: US 12,669,177 B2
(45) Date of Patent: Jun. 30, 2026

(54) REINFORCEMENT RING FOR GASKET OF A SINGLE-WALLED GROOVE

(71) Applicant: GM GLOBAL TECHNOLOGY OPERATIONS LLC, Detroit, MI (US)

(72) Inventors: Erich Gernand, Flint, MI (US); Sharanabasappa Madhwarkar, Bengaluru (IN); Harish Kelamane, Troy, MI (US); Virendra Kumar Dewangan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/975,758

(22) Filed: Dec. 10, 2024

(65) Prior Publication Data

US 2026/0160333 A1     Jun. 11, 2026

(51) Int. Cl.
*F16J 15/08*          (2006.01)
(52) U.S. Cl.
CPC .................................. *F16J 15/0818* (2013.01)
(58) Field of Classification Search
CPC ....... F16J 15/0818; F16J 15/3452; F16J 15/34
See application file for complete search history.

(56) References Cited

U.S. PATENT DOCUMENTS 3,279,805 A     10/1966  Quinson
3,836,296 A  *  9/1974  Sakamaki ............... F01C 19/08
                                                    418/142

3,838,863 A     10/1974  Rouger
4,058,321 A  *  11/1977  Gavrun ................ F16J 15/3452
                                                    277/357
4,467,751 A  *   8/1984  Asaka ...................... F16J 15/48
                                                    123/190.17
4,917,389 A  *   4/1990  Baker ...................... F16J 15/36
                                                    277/392
5,947,479 A  *   9/1999  Ostrowski ............ F16J 15/3452
                                                    277/374
2015/0285381 A1*  10/2015  Preston .................. F16J 15/021
                                                    277/612
2018/0245727 A1*   8/2018  Quesada .............. F16J 15/0818
2020/0130411 A1*   4/2020  Duch .................... F16C 33/768
2021/0270371 A1*   9/2021  Leinung ................. F16J 15/061

(Continued)

FOREIGN PATENT DOCUMENTS

DE      102024125203 B3 *  7/2025  ............. F16J 15/121
GB          2064678 A  *  6/1981  ........... F16J 15/3252

OTHER PUBLICATIONS

German Office Action from counterpart DE1020251021058, dated Jul. 28, 2025.

*Primary Examiner* — Eugene G Byrd

(57)               ABSTRACT

A seal assembly including: a housing including a wall; a gasket surrounded by the wall; and a reinforcement member defining an aperture and extending continuously and entirely around the aperture, the reinforcement member in contact with the gasket and surrounded by the gasket such that the gasket is between the reinforcement member and the wall of the housing. The reinforcement member includes a spring at which the reinforcement member is configured to compress during insertion of the reinforcement member within the gasket, the spring is biased outward to press the reinforcement member against the gasket and press the gasket against the wall of the housing.

18 Claims, 3 Drawing Sheets

(56)               References Cited

U.S. PATENT DOCUMENTS

| | | |
|---|---|---|
| 2022/0018436 A1* | 1/2022 | Lundstrom .......... F16J 15/0818 |
| 2022/0186834 A1* | 6/2022 | Meinig ................ F16J 15/0831 |
| 2024/0141851 A1* | 5/2024 | Oshima ................... F02F 1/166 |
| 2024/0200655 A1* | 6/2024 | Miller .................. F16J 15/0818 |
| 2024/0380024 A1* | 11/2024 | Han .................... H01M 10/613 |

* cited by examiner

REINFORCEMENT RING FOR GASKET OF A SINGLE-WALLED GROOVE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a reinforcement ring for a gasket configured to be inserted in a single-walled groove.

A vehicle typically includes numerous connecting joints. Many of the connecting joints include a gasket, which may provide a liquid-tight seal. Such a connecting joint may be found at, for example, an interface between an engine oil cooler and an upper oil pan. Connecting joints with a gasket are included with various non-automotive applications as well.

SUMMARY

The present disclosure provides for, in various features, a seal assembly including: a housing including a wall; a gasket surrounded by the wall; and a reinforcement member defining an aperture and extending continuously and entirely around the aperture, the reinforcement member in contact with the gasket and surrounded by the gasket such that the gasket is between the reinforcement member and the wall of the housing. The reinforcement member includes a spring at which the reinforcement member is configured to compress during insertion of the reinforcement member within the gasket, the spring is biased outward to press the reinforcement member against the gasket and press the gasket against the wall of the housing.

In further features, the housing includes a ledge adjacent to the wall, the gasket is seated on the ledge.

In further features, the gasket is made of an elastomeric material.

In further features, the reinforcement member includes an upper rounded edge and a lower rounded edge that is opposite to the upper rounded edge.

In further features, the reinforcement member is a steel ring.

In further features, the reinforcement member is shorter than the wall, and the gasket extends above the wall.

In further features, the reinforcement member is non-circular.

In further features, the gasket and the reinforcement member each have an elliptical shape.

In further features, the reinforcement member is clover-shaped.

In further features, the reinforcement member includes a first linear side, a second linear side, a first curved end connecting the first linear side to the second linear side, and a second curved end connecting the first linear side to the second linear side.

In further features, the spring is a first spring at the first curved end; and the reinforcement member includes a second spring at the second curved end that is opposite to the first spring. The second spring is configured to compress during insertion of the reinforcement member within the gasket. The second spring is biased outward to expand the reinforcement member, press the reinforcement member against the gasket, and press the gasket against the wall.

In further features, each one of the first spring and the second spring is defined by an inward fold of the reinforcement member.

In further features, the spring is one of a plurality of springs each configured to compress during insertion of the reinforcement member within the gasket, the plurality of springs preloaded to expand the reinforcement member outward, press the reinforcement member against the gasket, and press the gasket against the wall.

The present disclosure also provides for, in various features, a seal assembly including: a housing including a wall and a ledge extending inward from the wall; a gasket seated on the ledge and abutting the wall, the gasket surrounded by the wall; and a reinforcement member seated on the ledge and abutting the gasket. The reinforcement member is non-circular, shorter than the wall, and includes a rounded top surface and a rounded bottom surface. The reinforcement member defines an aperture and extends continuously and entirely around the aperture. The reinforcement member includes a first spring and a second spring. Each one of the first spring and the second spring is compressible during insertion of the reinforcement member within the gasket and biased outward to both expand the reinforcement member against the gasket and press the gasket against the wall.

In further features, each one of the first spring and the second spring includes an inward fold with a semi-circular shaped portion.

In further features, the reinforcement member is non-circular.

In further features, the first spring and the second spring are both between a first half of the reinforcement member and a second half of the reinforcement member.

The present disclosure also provides for, in various features, a seal assembly including: a housing having a wall; a gasket surrounded by the wall; and a reinforcement member defining an aperture and extending continuously and entirely around the aperture, the reinforcement member in contact with the gasket and surrounded by the gasket such that the gasket is between the reinforcement member and the wall of the housing. The reinforcement member includes a first inwardly folded portion and a second inwardly folded portion. The first inwardly folded portion and the second inwardly folded portion are opposite to each other and extend towards each other. Each one of the first inwardly folded portion and the second inwardly folded portion is compressible during insertion of the reinforcement member within the gasket. Each one of the first inwardly folded portion and the second inwardly folded portion is biased outward to expand the reinforcement member against the gasket and press the gasket against the wall.

In further features, the first inwardly folded portion is configured as a first spring and the second inwardly folded portion is configured as a second spring.

In further features, the reinforcement member is non-circular, shorter than the gasket, and the gasket extends above the wall.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The present disclosure includes a seal assembly for a connecting joint, such as an automotive or non-automotive connecting joint. The seal assembly includes a gasket, which provides a liquid-tight seal. Such connecting joints and seal assemblies can be used at various locations. With respect to automotive connecting joints, they may be used, for example, to connect an engine oil cooler to an upper oil pan, to connect an engine oil pump to an upper oil pan, at an oil cooler joint, etc. The seal assembly of the present disclosure includes a housing with an outer wall, but no inner wall. Elimination of an inner wall saves space, simplifies manufacturing, and enhances sealing, for example. The gasket is seated against the outer wall. A reinforcement member is seated against the gasket to prevent the gasket from rolling inward, away from the outer wall. The reinforcement member includes a spring at which the reinforcement member is configured to compress during insertion of the reinforcement member within the gasket. The spring is biased outward to press the reinforcement member against the gasket and press the gasket against the well.

Figures 1, 2:
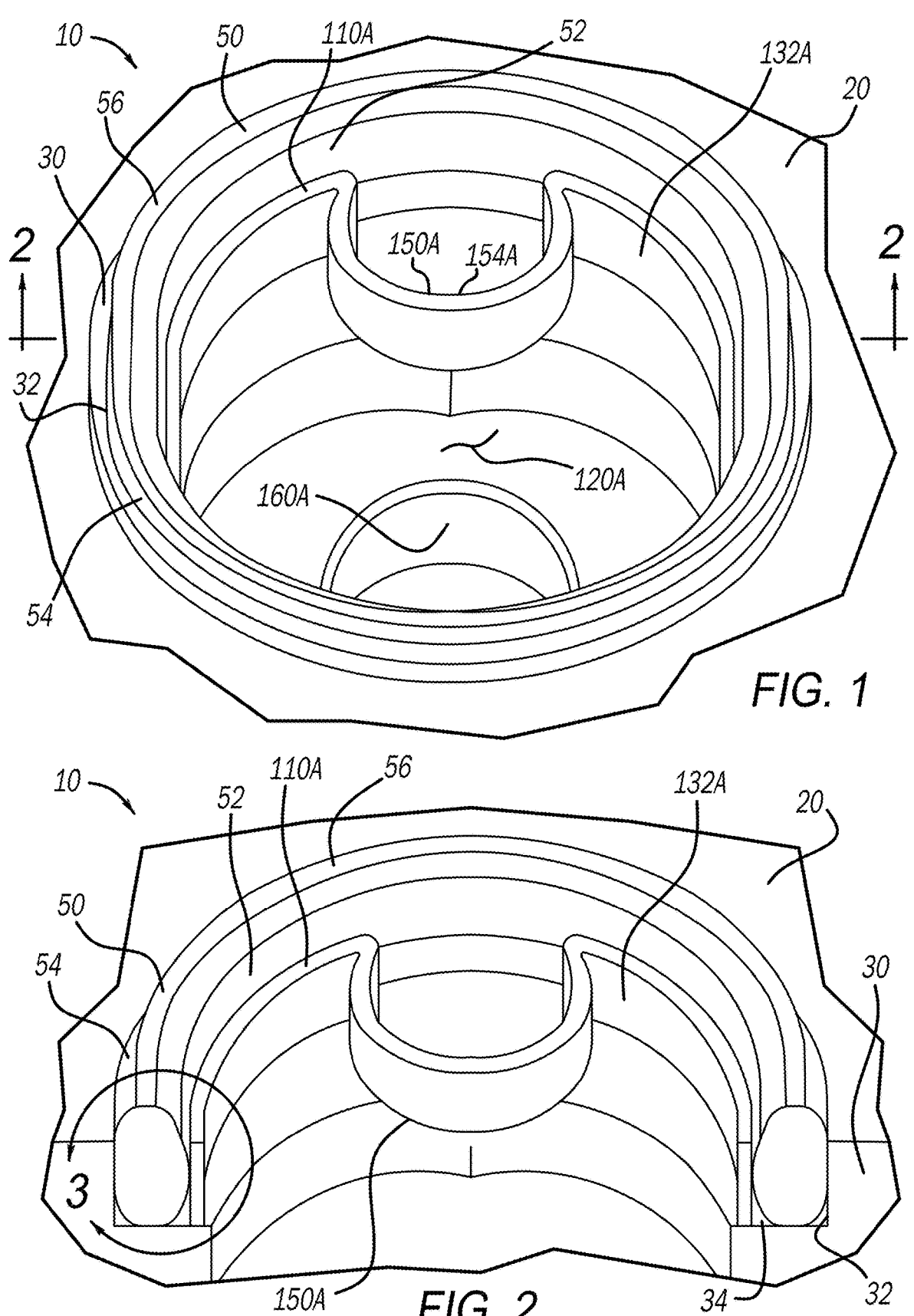
FIG. 1 is a perspective view of a seal assembly including a reinforcement member in accordance with the present disclosure.
FIG. 2 is a cross-sectional view of FIG. 1 taken along line 2-2 of FIG. 1.
Figures 3, 4, 5:
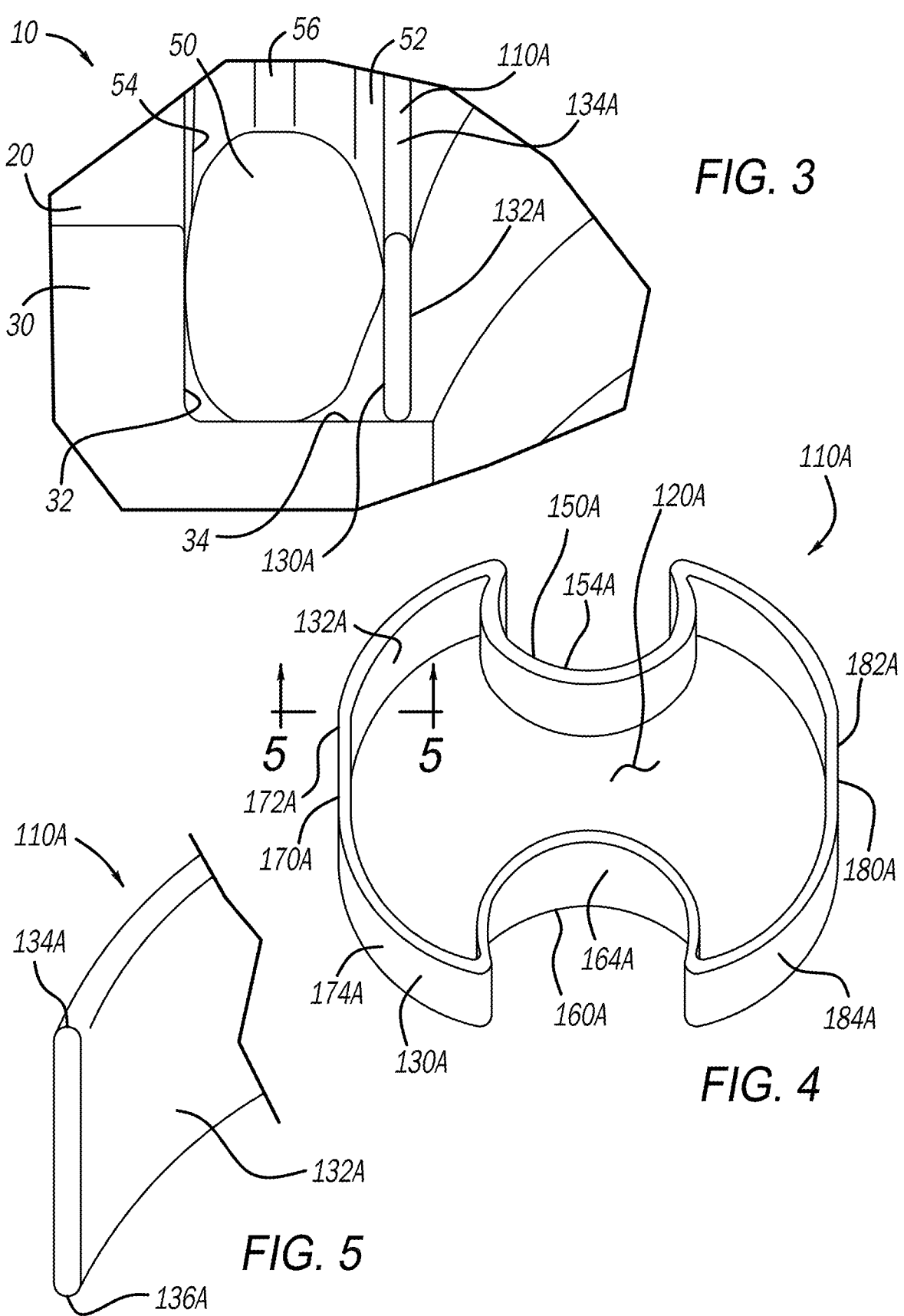
FIG. 3 illustrates area 3 of FIG. 2.
FIG. 4 is a perspective view of the reinforcement member of the seal assembly of FIG. 1.
FIG. 5 is a cross-sectional view of the reinforcement member taken along line 5-5 of FIG. 4.

FIGS. 1-3 illustrate an exemplary seal assembly 10 in accordance with the present disclosure. The seal assembly 10 is illustrated as included with an exemplary component or part 20. The part 20 may be any suitable automotive or non-automotive part. For example, the part 20 may be an engine oil cooler, an upper oil pan, an engine pump, etc.

The seal assembly 10 includes a housing 30, which may include, or be configured as, a flange. The housing 30 includes an outer wall 32. The housing 30 does not include an inner wall. The outer wall 32 may have any suitable non-circular shape. For example, the outer wall 32 may have an elliptical shape. Extending inward from the outer wall 32 is a ledge 34 (see FIGS. 2 and 3, for example).

Seated on the ledge 34 is a gasket 50. The gasket 50 is surrounded by the outer wall 32. The gasket 50 may be elliptical as illustrated, or have any other suitable shape. The shape of the gasket 50 will typically correspond to the shape of the outer wall 32. The gasket 50 includes an inner gasket surface 52 and an outer gasket surface 54, which is generally opposite to the inner gasket surface 52. The outer gasket surface 54 contacts the outer wall 32 of the housing 30. The gasket 50 further includes an upper gasket surface 56. The gasket 50 is configured to provide a liquid-tight seal, and may be made of any suitable material to provide such a seal. For example, the gasket 50 may be made of any suitable elastomeric material. The gasket 50 seals against another part (not shown) seated against the gasket 50 and the housing 30.

The seal assembly 10 further includes a reinforcement member 110A. The reinforcement member 110A is in contact with the inner gasket surface 52 of the gasket 50. The reinforcement member 110A may be seated on the ledge 34, such that the gasket 50 is between the reinforcement member 110A and the housing 30. The reinforcement member 110A may have any suitable shape, such as any suitable non-circular shape. In the example of FIGS. 1-4, the reinforcement member 110A has a generally elliptical shape. The reinforcement member 110A defines an aperture 120A (FIGS. 1 and 4). The reinforcement member 110A extends continuously and entirely around the aperture 120A. Thus, the reinforcement member 110A is not open-ended, but rather a continuous elliptical (or other suitable non-circular shape) member. The reinforcement member 110A is in contact with the gasket 50 and surrounded by the gasket 50 such that the gasket 50 is between the reinforcement member 110A and the outer wall 32 of the housing 30.

The reinforcement member 110A includes an outer ring surface 130A and an inner ring surface 132A, which is opposite to the outer ring surface 130A. The outer ring surface 130A abuts the inner gasket surface 52 of the gasket 50. The reinforcement member 110A has a height that is shorter than the outer wall 32 to facilitate cooperation between the housing 30/gasket 50 and an opposite side of the seal assembly 10 (not shown). The reinforcement member 110A also has a maximum height that is shorter than the gasket 50. Thus, an upper end 134A of the reinforcement member 110A is below the upper gasket surface 56 when installed (FIG. 3, for example).

The reinforcement member 110A may be made of any suitable material. For example, the reinforcement member 110A may be made of any suitable steel material. The reinforcement member 110A is flexible and biased to expand outward against the inner gasket surface 52, which prevents the gasket 50 from potentially rolling inward away from the outer wall 32. The reinforcement member 110A is generally "preloaded" to expand radially outward against the inner gasket surface 52 so that the reinforcement member 110A and the gasket 50 do not detach from each other. The reinforcement member 110A maintains the gasket 50 in place in the absence of an inner wall of the housing 30, and enhances sealing performance of the gasket 50. The elimination of an inner wall saves space, reduces weight, and provides various other advantages.

The reinforcement member 110A is configured to contract and expand to facilitate insertion of the reinforcement member 110A within the gasket 50, and to respond to changes in temperature. To facilitate the expansion and contraction, the reinforcement member 110A includes at least one spring. Thus, the reinforcement member may include one spring, two springs (see FIGS. 1-5), or more than two springs. In the example of FIGS. 1-4, the reinforcement member 110A includes a first spring 150A and a second spring 160A. At the first spring 150A and the second spring 160A, the reinforcement member 110A is configured to compress during insertion of the reinforcement member 110A within the gasket 50. The first spring 150A and the second spring 160A are biased outward to press the reinforcement member 110A against the gasket 50 and press the gasket 50 against the outer wall 32. To facilitate movement of the reinforcement member 110A against the inner gasket surface 52 during the expansion and the contraction, the upper end 134A and a lower end 136A are both rounded, curved, or tapered, which helps reduce any potential snagging between the reinforcement member 110A and the gasket 50 during expansion and contraction of the reinforcement member 110A.

Figures 6, 7, 8:
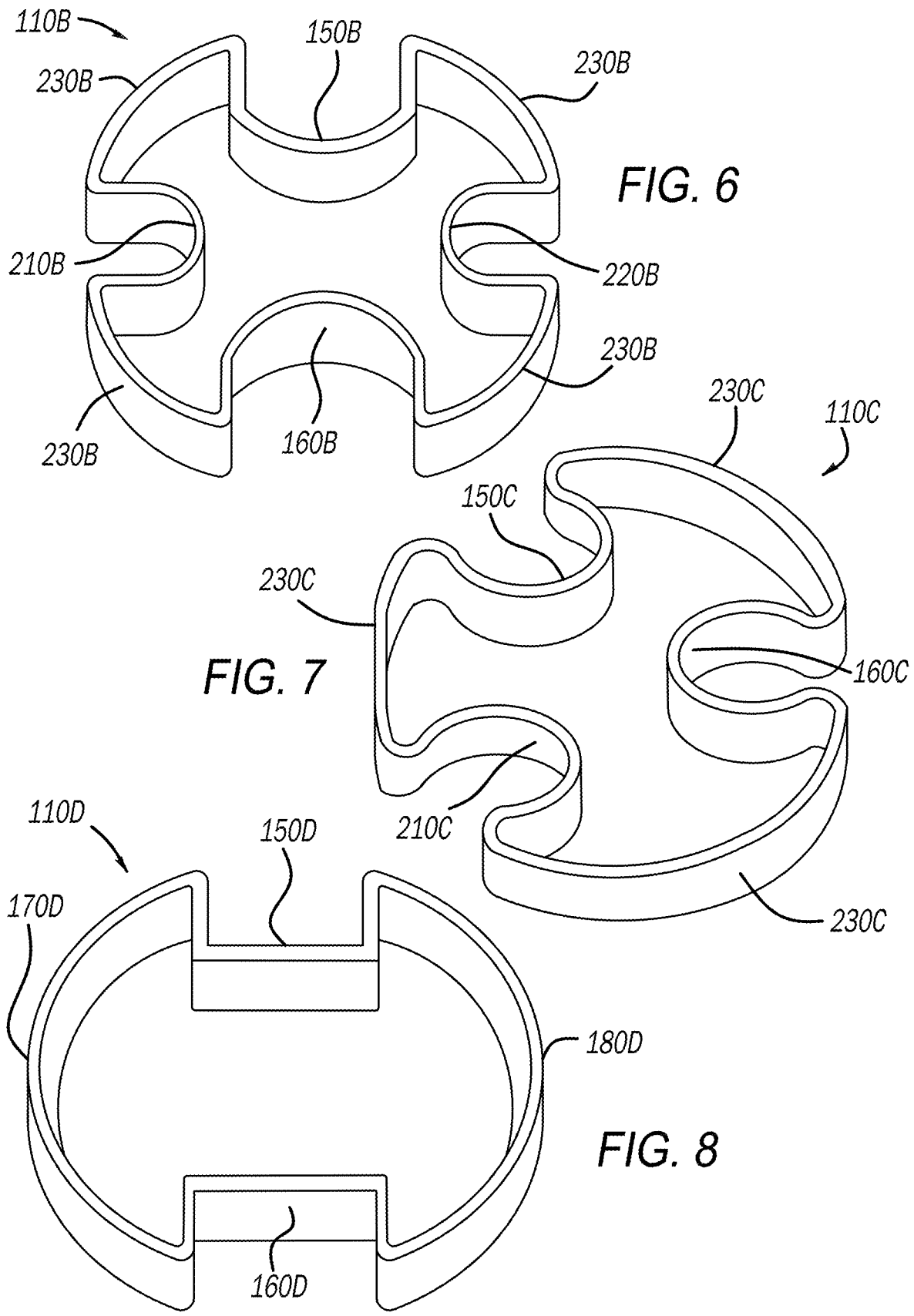
FIG. 6 is a perspective view of an additional reinforcement member in accordance with the present disclosure.
FIG. 7 is a perspective view of another reinforcement member in accordance with the present disclosure.
FIG. 8 is a perspective view of a further reinforcement member in accordance with the present disclosure.

The first spring 150A and the second spring 160A are integral with the reinforcement member 110A, and formed as part of the reinforcement member 110A in any suitable manner. For example, the first spring 150A and the second spring 160A may be configured as inwardly folded portions of the reinforcement member 110A. In the example illustrated, the first spring 150A includes a first curved portion 154A. The second spring 160A includes a second curved portion 164A. The first curved portion 154A and the second curved portion 164A may alternatively be configured as linear portions (or as including linear portions), such as illustrated in the example of FIG. 8.

Extending between the first spring 150A and the second spring 160A is a first half or first side 170A of the reinforcement member 110A. Also extending between the first spring 150A and the second spring 160A is a second half or a second side 180A of the reinforcement member 110A (see FIG. 4, for example). Each one of the first side 170A and the second side 180A may have any suitable shape to provide the reinforcement member 110A with an overall non-circular shape. In the example of FIGS. 1-4, the first side 170A and the second side 180A include a generally planar middle area (a first middle area 172A and a second middle area 182A respectively) between curved ends (first curved ends 174A and second curved ends 184A), which connect to the first spring 150A and the second spring 160A.

When subject to increased temperature, the gasket 50 contracts, which contracts the reinforcement member 110A so that the reinforcement member 110A maintains contact with the gasket 50. As the reinforcement member 110A contracts, the first spring 150A and the second spring 160A contract. As the gasket 50 cools and expands, the reinforcement member 110A is configured to expand at the first spring 150A and the second spring 160A to maintain contact with the gasket 50.

The reinforcement member 110A is configured to subsequently contract and expand with the gasket 50 to maintain contact with the gasket 50, and prevent the gasket 50 from rolling inward away from the outer wall 32 during temperature fluctuations. The reinforcement member 110A has an inner diameter that is the same as, or generally the same as, an inner diameter of the gasket 50. The reinforcement member 110A remains in contact with the gasket 50 to prevent rotation of the reinforcement member 110A relative to the gasket 50.

FIGS. 6, 7, and 8 illustrate additional reinforcement members in accordance with the present disclosure, which may be included with the seal assembly 10 in place of the reinforcement member 110A (which is a first reinforcement member). With particular reference to FIG. 6, a second reinforcement member 110B is illustrated. The second reinforcement member 110B includes many of the same features of the reinforcement member 110A. Features of the second reinforcement member 110B that are the same as, or similar to, the first reinforcement member 110A are identified in the drawings with the same reference numbers, but with the letter "B" instead of "A." The description above of the first reinforcement member 110A applies to the second reinforcement member 110B for at least these features.

The second reinforcement member 110B includes four springs: a first spring 150B, a second spring 160B, a third spring 210B, and a fourth spring 220B. Each one of the first spring 150B, the second spring 160B, the third spring 210B, and the fourth spring 220B is the same as, or similar to, the first spring 150A and the second spring 160A. The first spring 150B is opposite to the second spring 160B. The third spring 210B is opposite to the fourth spring 220B. The first spring 150B, the second spring 160B, the third spring 210B, and the fourth spring 220B are each connected by curved portions 230B of the second reinforcement member 110B. The second reinforcement member 110B is generally configured to have a four-leaf clover shape. The second reinforcement member 110B is configured for use with seal assemblies 10 having a housing 30 and a gasket 50 of a similar shape.

FIG. 7 illustrates a third reinforcement member 110C. The third reinforcement member 110C includes many of the same features of the reinforcement member 110A. Features of the third reinforcement member 110C that are the same as, or similar to, the first reinforcement member 110A or the second reinforcement member 110B are identified in the drawings with the same reference numbers, but with the letter "B." The description above of the first reinforcement member 110A and the second reinforcement member 110B applies to the third reinforcement member 110C for at least these features.

The third reinforcement member 110C includes three springs: a first spring 150C, a second spring 160C, and a third spring 210C. Each one of the first spring 150C, the second spring 160C, and the third spring 210C is the same as, or similar to, the first spring 150A and the second spring 160A (as well as the first spring 150B, the second spring 160B, and the third spring 210B). The first spring 150C, the second spring 160C, and the third spring 210C are each connected by curved portions 230C of the third reinforcement member 110C. The third reinforcement member 110C is generally configured to have a three-leafed clover shape. The third reinforcement member 110C is configured for use with seal assemblies 10 having a housing 30 and a gasket 50 of a similar shape.

The fourth reinforcement member 110D includes two springs: a first spring 150D and a second spring 160D. Each one of the first spring 150D and the second spring 160D is similar to the first spring 150A and the second spring 160A. But, the first curved portion 154A and the second curved portion 164A are replaced with linear portions of the first spring 150D and the second spring 160D.

Extending between the first spring 150D and the second spring 160D is a first half or first side 170D of the fourth reinforcement member 110D. Also extending between the first spring 150D and the second spring 160D is a second half or a second side 180D of the fourth reinforcement member 110D. Each one of the first side 170D and the second side 180D may have any suitable shape to provide the fourth reinforcement member 110D with an overall non-circular shape. In the example of FIG. 8, the first side 170D and the second side 180D are continuously curved (or generally continuously curved) to provide the fourth reinforcement member 110D with an elliptical shape.

The features described above of the first reinforcement member 110A, the second reinforcement member 110B, the third reinforcement member 110C, and the fourth reinforcement member 110D are generally interchangeable. For example, the first reinforcement member 110A may include the linear portions of the first spring 150D and the second spring 160D in place of the first curved portion 154A and the second curved portion 164A. Also, the first middle area 172A and the second middle area 182A may be curved instead of linear to give the first reinforcement member 110A a more elliptical shape, such as similar to the elliptical shape of the fourth reinforcement member 110D. And, any of the springs of the first reinforcement member 110A, the second reinforcement member 110B, and the fourth reinforcement member 110D may be more rounded as illustrated with the springs of the third reinforcement member 110C. Any other modifications substituting (e.g., mixing and matching) various disclosed features of the reinforcement members may be made as well.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A seal assembly comprising:
    a housing including a wall;
    a gasket surrounded by the wall; and
    a reinforcement member defining an aperture and extending continuously and entirely around the aperture, the reinforcement member in contact with the gasket and surrounded by the gasket such that the gasket is between the reinforcement member and the wall of the housing, wherein the reinforcement member includes a spring at which the reinforcement member is configured to compress during insertion of the reinforcement member within the gasket, the spring is biased outward to press the reinforcement member against the gasket and press the gasket against the wall of the housing, and
    wherein the reinforcement member includes a first linear side, a second linear side, a first curved end connecting the first linear side to the second linear side, and a second curved end connecting the first linear side to the second linear side.

2. The seal assembly of claim 1, wherein the housing further includes a ledge adjacent to the wall, the gasket is seated on the ledge.

3. The seal assembly of claim 1, wherein the gasket is made of an elastomeric material.

4. The seal assembly of claim 1, wherein the reinforcement member includes an upper rounded edge and a lower rounded edge that is opposite to the upper rounded edge.

5. The seal assembly of claim 1, wherein the reinforcement member is a steel ring.

6. The seal assembly of claim 1, wherein the reinforcement member is shorter than the wall, and the gasket extends above the wall.

7. The seal assembly of claim 1, wherein the reinforcement member is non-circular.

8. The seal assembly of claim 1, wherein the gasket and the reinforcement member each have an elliptical shape.

9. The seal assembly of claim 1, wherein the reinforcement member is clover-shaped.

10. The seal assembly of claim 1, wherein:
    the spring is a first spring at the first curved end; and
    the reinforcement member includes a second spring at the second curved end that is opposite to the first spring, the second spring is configured to compress during insertion of the reinforcement member within the gasket, the second spring is biased outward to expand the reinforcement member, press the reinforcement member against the gasket, and press the gasket against the wall.

11. The seal assembly of claim 10, wherein each one of the first spring and the second spring is defined by an inward fold of the reinforcement member.

12. The seal assembly of claim 1, wherein the spring is one of a plurality of springs each configured to compress during insertion of the reinforcement member within the gasket, the plurality of springs preloaded to expand the reinforcement member outward, press the reinforcement member against the gasket, and press the gasket against the wall.

13. A seal assembly comprising:
    a housing including a wall and a ledge extending inward from the wall;
    a gasket seated on the ledge and abutting the wall, the gasket surrounded by the wall; and
    a reinforcement member seated on the ledge and abutting the gasket, the reinforcement member is non-circular, shorter than the wall, and includes a rounded top surface and a rounded bottom surface, the reinforcement member defining an aperture and extending continuously and entirely around the aperture,
    wherein the reinforcement member includes a first spring and a second spring, each one of the first spring and the second spring is compressible during insertion of the reinforcement member within the gasket and biased outward to both expand the reinforcement member against the gasket and press the gasket against the wall, and wherein the first spring and the second spring are both between a first half of the reinforcement member and a second half of the reinforcement member.

14. The seal assembly of claim 13, wherein each one of the first spring and the second spring includes an inward fold with a semi-circular shaped portion.

15. The seal assembly of claim 13, wherein the reinforcement member is non-circular.

16. A seal assembly comprising:

a housing including a wall;

a gasket surrounded by the wall; and a reinforcement member defining an aperture and extending continuously and entirely around the aperture, the reinforcement member in contact with the gasket and surrounded by the gasket such that the gasket is between the reinforcement member and the wall of the housing, wherein the reinforcement member includes a first inwardly folded portion and a second inwardly folded portion, the first inwardly folded portion and the second inwardly folded portion are opposite to each other and extend towards each other, each one of the first inwardly folded portion and the second inwardly folded portion is compressible during insertion of the reinforcement member within the gasket, and each one of the first inwardly folded portion and the second inwardly folded portion is biased outward to expand the reinforcement member against the gasket and press the gasket against the wall, and wherein the first inwardly folded portion and the second inwardly folded portion are both between a first half of the reinforcement member and a second half of the reinforcement member.

17. The seal assembly of claim 16, wherein the first inwardly folded portion is configured as a first spring and the second inwardly folded portion is configured as a second spring.

18. The seal assembly of claim 16, wherein the reinforcement member is non-circular, shorter than the gasket, and the gasket extends above the wall.

* * * * *